United States Patent
Raven et al.

(10) Patent No.: US 9,790,798 B2
(45) Date of Patent: Oct. 17, 2017

(54) ROTOR BLADE MANUFACTURE

(71) Applicant: ROLLS-ROYCE PLC, London (GB)

(72) Inventors: Gemma Alexandra Raven, Royston (GB); Christopher Jonathan Taylor, Derby (GB); Alexander David May, Ripley (GB); Andrew Alan Robert Baird, Derby (GB)

(73) Assignee: ROLLS-ROYCE plc, London (GB)

( * ) Notice: Subject to any disclaimer, the term of this patent is extended or adjusted under 35 U.S.C. 154(b) by 278 days.

(21) Appl. No.: 14/725,785

(22) Filed: May 29, 2015

(65) Prior Publication Data

US 2015/0369050 A1     Dec. 24, 2015

(30) Foreign Application Priority Data

Jun. 24, 2014     (GB) .................................. 1411182.7

(51) Int. Cl.
*F01D 5/00*     (2006.01)
*F01D 5/14*     (2006.01)
(Continued)

(52) U.S. Cl.
CPC .............. *F01D 5/141* (2013.01); *B24B 19/14* (2013.01); *F01D 5/005* (2013.01); *F01D 5/027* (2013.01); *F01D 5/288* (2013.01); *F01D 5/3038* (2013.01); *F01D 5/3092* (2013.01); *F05D 2220/32* (2013.01); *F05D 2230/10* (2013.01); *F05D 2230/60* (2013.01); *F05D 2230/61* (2013.01);
(Continued)

(58) Field of Classification Search
CPC ........ F01D 5/141; F01D 5/005; F01D 5/3038; F01D 5/027; F01D 5/288; F01D 5/3092; B24B 19/14; F05D 2230/61; F05D 2220/32; F05D 2230/60; F05D 2230/10; F05D 2230/90; Y10T 29/49323
See application file for complete search history.

(56) References Cited

U.S. PATENT DOCUMENTS

| 4,029,436 A | 6/1977 | Shoup, Jr. et al. |
| 5,240,375 A * | 8/1993 | Wayte ....................... F01D 5/28 |
| | | 416/219 R |

(Continued)

FOREIGN PATENT DOCUMENTS

| DE | 35 12 569 A1 | 10/1986 |
| DE | 199 21 198 C1 | 6/2000 |

(Continued)

OTHER PUBLICATIONS

Nov. 20, 2015 Search Report issued in British Patent Application No. GB1509236.4.
Jan. 21, 2015 Search Report issued in British Application No. GB1411182.7.

(Continued)

*Primary Examiner* — Richard Chang
(74) *Attorney, Agent, or Firm* — Oliff PLC

(57) ABSTRACT

A method is provided of processing one or more blades of a row of blades which forms part of a rotor for a gas turbine engine. The method includes: providing a rotor disc having a slot for mounting one or more blades; applying tape at one or both sides of the slot such that when the blades are loaded in the slot the tape reduces a range of tilt angles which can be adopted by the blades; loading the blades in the slot; and performing a processing operation on the loaded blades.

10 Claims, 5 Drawing Sheets

(51) Int. Cl.
*B24B 19/14* (2006.01)
*F01D 5/28* (2006.01)
*F01D 5/30* (2006.01)
*F01D 5/02* (2006.01)

(52) U.S. Cl.
CPC ..... *F05D 2230/90* (2013.01); *Y10T 29/49323* (2015.01)

(56) References Cited

U.S. PATENT DOCUMENTS

| | | | |
|---|---|---|---|
| 5,573,377 A * | 11/1996 | Bond | F01D 5/147 416/219 R |
| 5,935,360 A * | 8/1999 | Griggs | F01D 5/3092 156/94 |
| 6,102,664 A | 8/2000 | Nguyen | |
| 2007/0048142 A1 | 3/2007 | Dambrine et al. | |
| 2009/0060745 A1 | 3/2009 | Douguet et al. | |
| 2012/0202405 A1 | 8/2012 | Saunders et al. | |
| 2013/0302173 A1 | 11/2013 | Booze et al. | |

FOREIGN PATENT DOCUMENTS

| | | |
|---|---|---|
| GB | 2 487 799 A | 8/2012 |
| WO | 2014/193512 A2 | 12/2014 |

OTHER PUBLICATIONS

Oct. 15, 2015 Search Report issued in European Patent Application No. 15 16 9814.

\* cited by examiner

ROTOR BLADE MANUFACTURE

CROSS-REFERENCE TO RELATED APPLICATIONS

This application is based upon and claims the benefit of priority from British Patent Application Number 1411182.7 filed 24 Jun. 2014, the entire contents of which are incorporated by reference.

BACKGROUND

1. Field of the Disclosure

The present disclosure relates to a method of manufacturing the blades of a rotor for a gas turbine engine. In particular, but not exclusively, this disclosure can relate to a method of grinding the tips of the blades.

2. Description of the Related Art

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

It is well known that to maintain an efficient gas turbine engine the gap between compressor blade tips and the engine casing is closely controlled to minimise the leakage of compressed air over the blade tips and back upstream. To this end, the engine casing often includes an abradable liner which provides a close fitting seal with the blade tips.

The abradable liner is initially installed so as to be in contact with the compressor blade tips. During the first few rotations of the compressor rotors, the abradable liner is scored by the rotating fan and compressor blade tips which remove just enough material to allow a free rotation of the compressor blades whilst maintaining a close gap. The abradable nature of the liner allows it to be sculpted by the blade tips to provide a tailored and close fit.

During engine use, the radial positions of the rotating blade tips move due to thermal expansion and vibration. This movement further rubs the abradable liner such that the mean operating gap between the blade tips and liner increases over time. This increases the leakage of air back up the compressor, thereby reducing efficiency and performance of the engine.

FIG. 2 shows a typical but exaggerated profile of an abradable liner 210 caused by compressor blade tip rub over time. The liner includes an outer surface 212 which is attached to the engine casing and an inner surface 214 which faces the rotor. In use, the blade rotates about the rotor axis, travelling in a direction perpendicular to the page, so as to contact and rub the liner. The profile of the rub 218 can be generally described as "M" shaped where the extent of the rub is greater towards the edges 220 of the rotational path of the blades than in the mid portion 222. Although the exact profile of the rub will change between rotors and engines, the "M" shaped profile is a reasonably common occurrence.

During manufacture of the rotors, the blades undergo a grinding process in which a blade assembly is rotated such that the tips of the blades pass a rotating grinding wheel which removes a portion of the blade. Typically, approximately one to two millimeters is removed from each blade tip with the grinding controlled such that the peak to peak height difference between leading and trailing edges of blade tip is typically less than 0.1 mm. In this way, the positions of the each of the blade tips can be controlled during rotation such that the erosion of the abradable liner is reduced. The blades can also undergo other processing operations during manufacture, such as measurement verification of blade concentricity.

There are two main types of compressor blade root construction:
  Circumferential, where the roots of the blade are loaded one after another into the rotor via a circumferential slot and moved round circumferentially until the stage is full, and
  Axial, where the roots of the blades are loaded into individual axially directed slots which are generally at an angle to the engine centreline.

FIG. 3 shows an axial root blade 250 on the left and circumferential root blade 252 on the right.

In FIG. 4 there is shown a cross section of an intermediate compressor rotor 310 having a blade 312 with a circumferential root 314 which is snugly received within a slot 316 in a disc 318. The blade includes a tip 320, a leading edge 322 and a trailing edge 324.

There is a degree of movement provided between the blade root 314 and disc slot 316 in order for the blades to be slotted into place. This allows the blade 312 to rest in different positions within the rotor as shown by the positions indicated by reference numeral 326a, the second by 326b and the third by 326c. The second position 326b represents the mid-point of the blade 312 within the slot 316 with the other two positions demonstrating the range of movement.

During use, the rotor is rotated at several thousand rpm which results in a radial centrifugal force acting on the blade 312. This results in a stiction between the shoulder of the root 328 and corresponding opposing surface of the slot 316, which keeps the blade 312 in a fixed position. It has been previously known that blades can move when the rotor 310 slows to a halt and the centrifugal force that locks the blades in place no longer applies. Thus, when in service, the blade 312 may fall into one or other of the extreme positions where they will remain until the engine is next started.

The above sequence of events leads to the movement of the blade and the different tilt positions leads to the tips of the blades being higher or lower in relation to the abradable liner. This results in the "M" shaped profiled in the liner. However, the extent of the "M" profile is greater than could be explained by the movement of the blades in this way In particular, it is known that the blades held within a blade assembly for grinding can move prior to the grinding operation, particularly when the grinding process is stopped part way through and restarted as is sometimes necessary if a blade is damaged and needs replacing. If one or more of the blades does move during this process, for example, from position 326a to position 326c as shown in FIG. 4, then the profile created by the grinding process is effectively skewed.

If the position of a blade alters during the grinding process then they will have different profiles with respect to one another. FIG. 5A shows a pair of blades 410, 412 which have moved during the grinding process and are no longer aligned. Although the grinding of the blade tips is well controlled such that the tip variance between blades is less than 100 microns, the different positions of the blades 410, 412 are not accounted for. Hence, as shown in FIG. 5B, if the blades 410, 412 move relative to the disc during service of the engine e.g. when the rotor comes to rest after a period of use, the blades 410, 412 can swap tilt positions and the error which would ordinarily be expected is doubled. The actual difference this leads to can be in the order of hundreds of microns.

Although discussed above in relation to circumferential root blades, similar problems of blade movement and different forward/rearward tilt positions can apply to axial root blades because of the angling of their roots relative to the engine centreline.

For example, FIG. 6 shows schematically a rearwards directed view of blade tip of a blade with an axial root for different levels of tilt. If the blade is tilted fully anti-clockwise in the root (as shown by the left hand blade in FIG. 6) when it is ground the blade is X1 longer than a blade that was centralised (shown by the central blade in FIG. 6) during grind. If this blade then rotates fully clockwise (as shown by the right hand blade in FIG. 6) during a subsequent run in the engine, the blade tip is (X1+X2) radially further outward that the nominal desired tip position. This may be a significant amount and results in the blade tip rubbing out the abradable liner by an additional (X1+X2) depth. This increases running clearances by (X1+X2) for a blade with a nominal blade tip position. For a blade that was tilted clockwise during grinding but then tilts anticlockwise during running, the blade tip will be (X1+X2) radially more inward than a nominal tip. This means if this blade is running within a casing that has suffered the (X1+X2) additional rub an equivalent additional tip clearance will exist. Accordingly, the effect on running clearances and hence compressor efficiency and surge margin may be significant.

Another unfortunate aspect of blade tilt associated with axial roots, is the effect it has on the angle of the tip of the longest blade. In the example described above and shown in FIG. 6, the drum rotational direction is clockwise i.e. from left to right in the diagram. The longest blade rotates clockwise by $\phi°$ relative to the position it was in when it was ground. This results in the blade tip having a negative relief (or clearance) angle with the casing of $\phi°$, with the suction surface edge touching the casing rather than the pressure surface edge. This negative relief angle makes the blade tip an inefficient cutting tool, such that for high incursions significant heat and blade vibration is created. This can result in over-cutting of the soft abradable liner due to heat build-up, softening of the liner material, and its deposit on the longest blade doing the rubbing. It can also result in aerofoil cracking due to vibration.

Excess blade tilt can also be a problem in other processing operations, such as when measuring blade stage concentricity, because variation in the blade tip positions around the circumference can cause false readings and bias in blade location analysis.

US 2012/202405 proposes a method of grinding blade tips which aligns the blades in a predetermined position using compressed air before the grinding operation.

It would be desirable to provide an improved method aligning blades during grinding and other processing operations.

OBJECTS AND SUMMARY

Accordingly, there is provided a method of processing one or more blades of a row of blades which forms part of a rotor for a gas turbine engine, the method including:
  providing a rotor disc having a slot for mounting one or more blades;
  applying tape at one or both sides of the slot such that when the blades are loaded in the slot the tape reduces a range of tilt angles which can be adopted by the blades;
  loading the blades in the slot; and
  performing a processing operation on the loaded blades.

The method further includes removing the tape from the disc after the processing operation, for example by manually removing the tape from the disc, washing the tape from the disc, or burning off the tape.

The reduced range of tilt angles available to the blades during the processing operation eliminates extreme blade positions. The reduced range of tilt angles may be relative to the range of tilt angles that could be adopted by the blade in the absence of the tape. For example, in relation to blade tip grinding, this results in a narrower distribution of post-ground blade lengths. In use, this leads to a corresponding reduction in the over-cutting of the profile formed in the abradable liner, which in turn decreases tip clearances and increases efficiencies. However, advantageously, the tape may not eliminate blade wobble entirely, as it is useful for avoiding excessive vibration or "ringing" of individual blades during processing, e.g. when forced by a grinding wheel. Such vibration can be damaging to both the blades and the disc.

Optional features will now be set out. These are applicable singly or in any combination.

The blades are generally compressor blades. However, they can be turbine blades, such as shroudless turbine blades.

The processing operation may be grinding the blade tips, or measurement of rotor concentricity. The processing operation may comprise rotating the disc and blades relative to a grinding or cutting tool.

By appropriate choice of tape thickness, the tape may reduce the range of tilt angles by at least 50%, and preferably by at least 60% or 70%. However, preferably the tape reduces the range of tilt angles by at most 90% or 80%, some residual clearance facilitating assembly of the blades into the rotor and avoiding excessive vibration during processing.

The slot may be a circumferential slot for mounting a plurality of blades. Alternatively, the disc may have a plurality of axial slots for mounting respective blades, tape being applied at one or both sides of each slot, and the blades being loaded in the slots. Either way, the slots may be configured to accept dovetail or fir tree blade roots.

The blades may have laterally-projecting platforms which extend over a rim of the disc. Such an arrangement is typical for the circumferential slot configuration. When the blades have such platforms, the tape may reduce the clearance between the platforms and the rim and thereby reduce the range of tilt angles which can be adopted by the blades.

Another option (typically used for the axial slot configuration) is for the tape to reduce the distance across the mouth of the slot and thereby reduce the range of tilt angles which can be adopted by the blades.

Conveniently the tape can be a polymer tape.

The tape may have an adhesive layer for adhering to the disc. This can help to maintain the tape in position when the blades are loaded in the slot. Also it can facilitate simple remove of the tape.

The method may further include balancing the blades before the blades are processed.

The method may further include applying a protective coating to the loaded blades to protect the blades from debris generated during the processing operation. The blades can then be washed after the processing operation to remove the protective coating. Such washing can also help to remove the tape.

BRIEF DESCRIPTION OF THE DRAWINGS

Embodiments will now be described by way of example with reference to the accompanying drawings in which.

DETAILED DESCRIPTION OF EMBODIMENTS

The method of the present disclosure can reduce the range of available blade tilt angles during the tip grinding process, allowing all the blades to be accurately and consistently located so that a more concentric rotor can be ground. It also has utility in other processing operations such as measurement verification of blade concentricity.

In the case of a grinding process performed on a circumferentially slotted disc, the method can involve applying layers of adhesive tape to the front and/or rear disc rim edges, to act effectively as a controlled, and removable, coating on the disc surface which supports both sides of the blade. The blades are then loaded over the tape layer, balanced, coated with a protective paint, and ground. During the subsequent standard wash process to remove the paint, the tape is loosened, and can then be pulled out by hand, cut, and unthreaded from the circumference of the disc.

Figure 1:
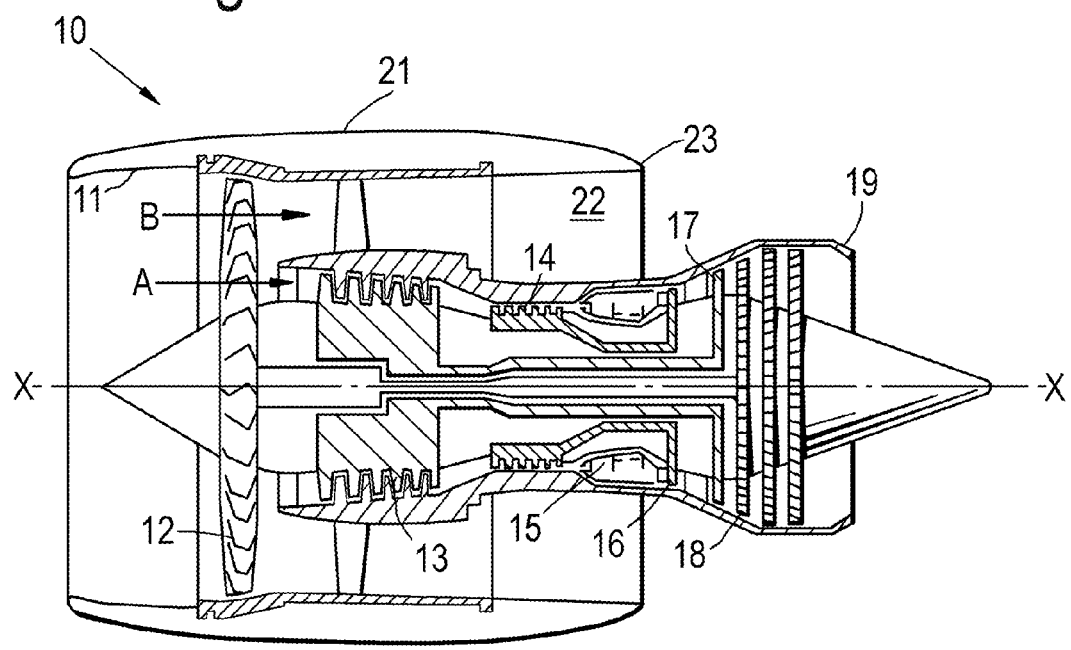
FIG. 1 shows a longitudinal cross-section through a ducted fan gas turbine engine.
Figure 2:
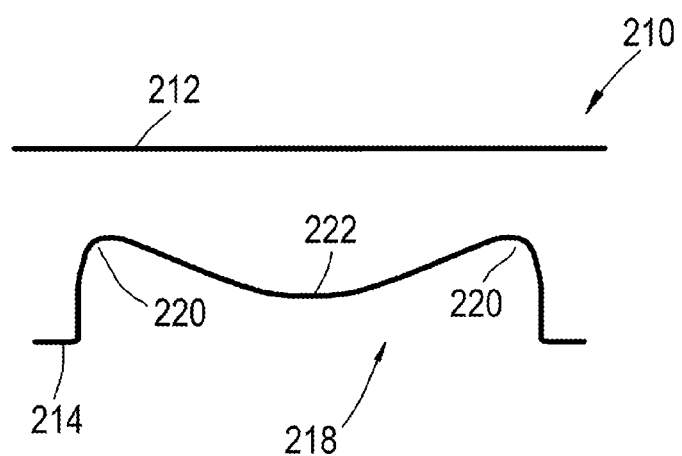
FIG. 2 shows a typical abradable liner tip rub profile.
Figure 3:
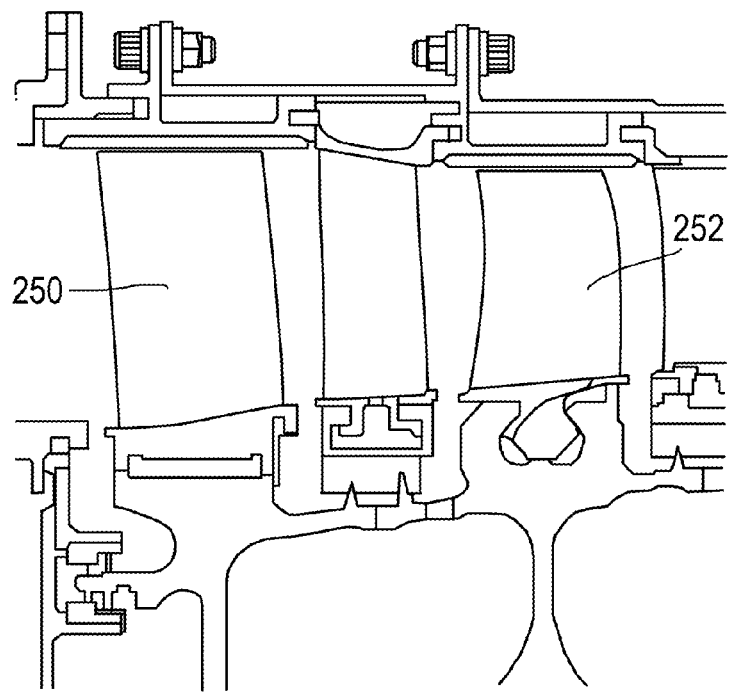
FIG. 3 shows an axial root blade on the left and circumferential root blade on the right.
Figure 4:
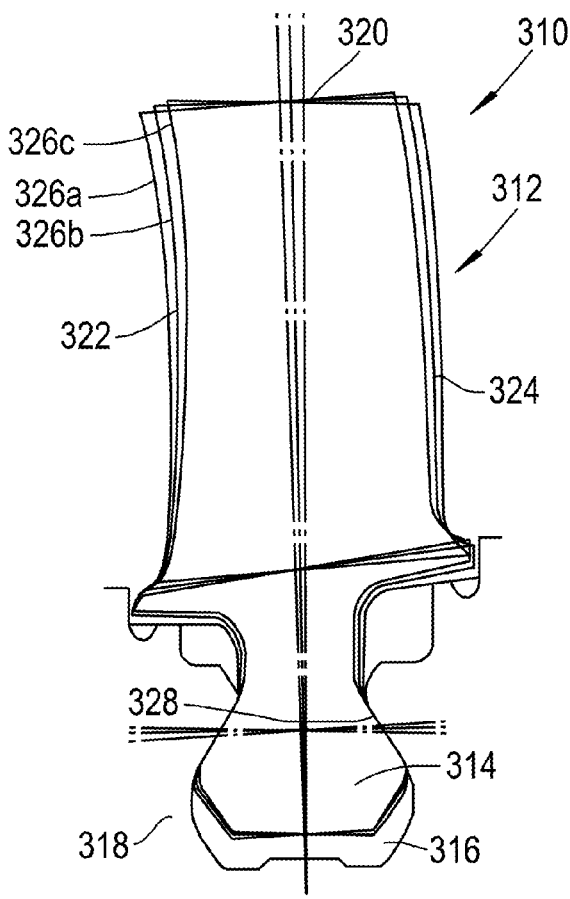
FIG. 4 shows schematically three tilt positions in which a blade can rest relative to a disc.
Figure 5A:
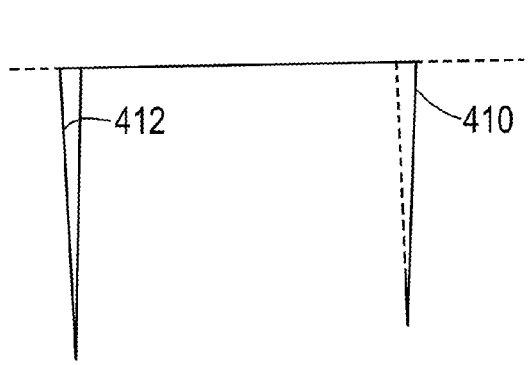
FIG. 5A shows schematically a ground profile of two blades resting in two positions during the grinding process.
Figure 5B:
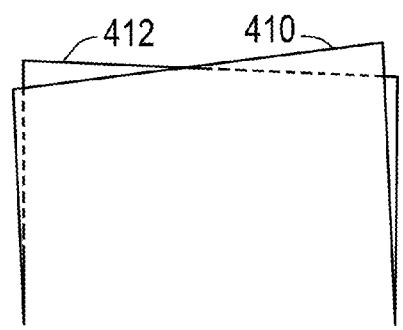
FIG. 5B shows schematically the ground blades with resting positions swapped during a period of use.
Figure 6:
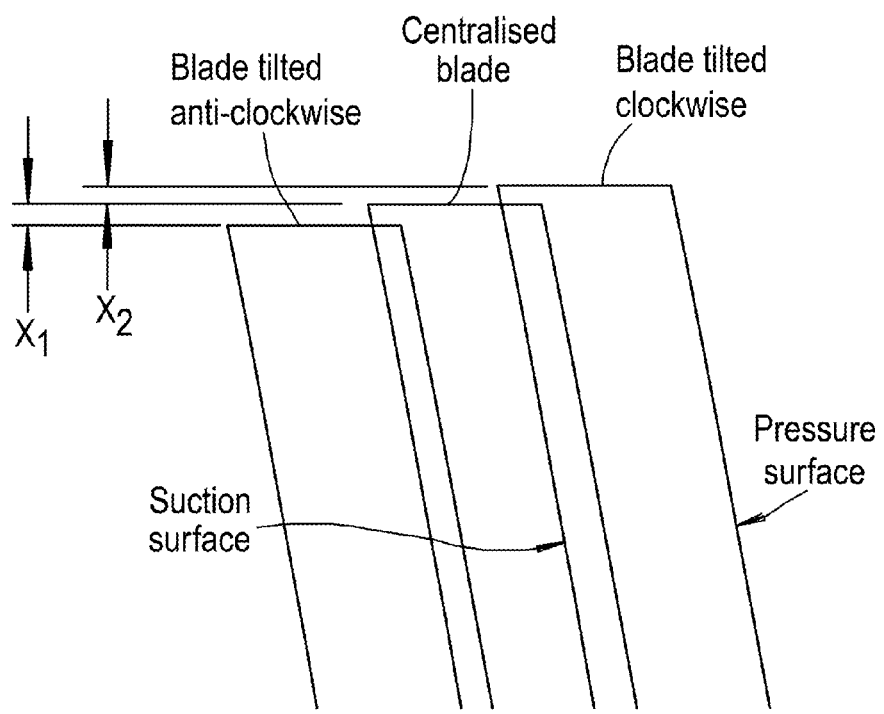
FIG. 6 shows schematically a rearwards directed view of blade tip of a blade with an axial root for different levels of tilt.
Figure 7A:
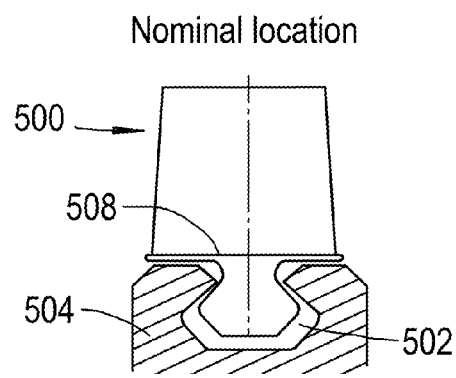
FIG. 7A shows schematically a blade loaded in a circumferential slot of a disc and set at its nominal location.
Figure 7B:
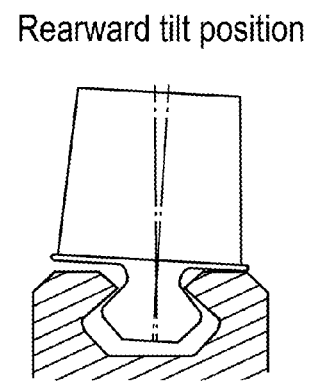
FIG. 7B shows the blade in the same slot but tilted to its maximum rearward location.

FIG. 7A shows schematically a blade 500 loaded in a circumferential slot 502 of a disc 504 and set at its nominal location (i.e. zero tilt angle). FIG. 7B shows the blade in the same slot but tilted to its maximum rearward location.

Figure 7C:
FIG. 7C shows the same disc, but now with tape applied along the edges of the slot.
Figure 7D:
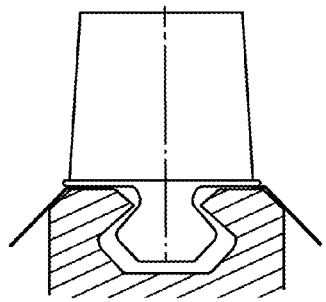
FIG. 7D shows the blade loaded in the slot of the taped disc and set at its nominal location.
Figure 7E:
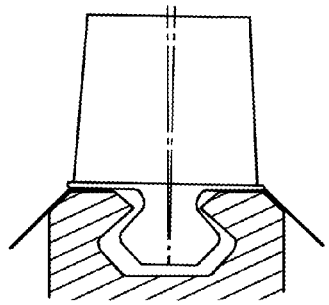
FIG. 7E shows the blade in the slot of the taped disc and tilted to its now reduced maximum rearward location.

FIG. 7C shows the same disc, but now with tape 506 applied along the edges of the slot 502. As illustrated by FIG. 7D, which shows the blade loaded in the slot of the taped disc and set at its nominal location, the tape reduces the clearance between the blade platform 508 and the rim of the disc. In this way, the range of tilt angles which can be adopted by the blade is reduced, as illustrated by FIG. 7E which shows the blade tilted to its now reduced maximum rearward location. A small residual amount of tilt is advantageous for facilitating assembly of the blades into the rotor and for avoiding excessive vibration during processing.

Figure 8:
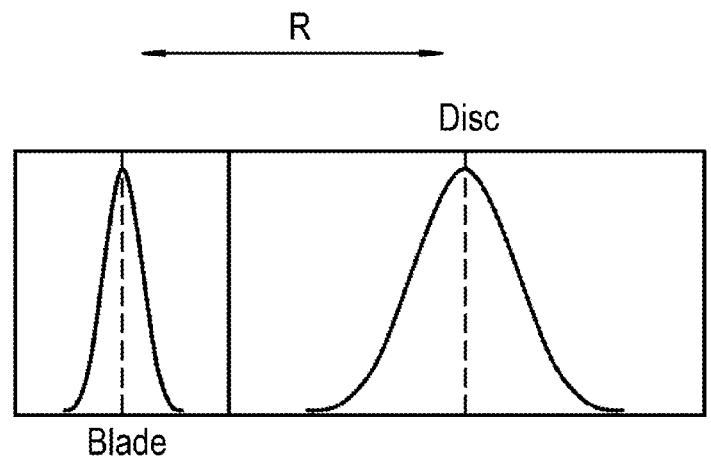
FIG. 8 shows respective distributions for the manufacturing tolerances of a blade and a disc, the horizontal distance between the two dashed vertical lines at the centres of the two distributions indicating a nominal radial clearance between the underside of the blade platform and the rim of the disc when the blade is centrifuged outwardly in its zero tilt location.

The tape can be a heavy duty polymer film tape. Preferably it has good adhesion properties to the metal of the rim and leaves no residue on removal. Further it should be sufficiently strong to be pulled off by hand without significant stretching or breaking. For example, the tape can be polyester silicone adhesive masking tape. Different thicknesses of tape can be used depending on the amount of original blade tip to be eliminated and on the manufacturing tolerances of the slot and the blades. Multiple layers of tape can be used to obtain desired overall tape thicknesses. For example, FIG. 8 shows respective distributions for the manufacturing tolerances of the blade and the disc, and the horizontal distance between the two dashed vertical lines at the centres of the two distributions indicating a nominal radial clearance R between the underside of the blade platform and the rim of the disc when the blade is centrifuged outwardly in its zero tilt location. In this scenario a total tape thickness of about 70% of R can remove most of the range of tilt angles, while ensuring that even in a worst case scenario (with blade and rim at the limits of their manufacturing tolerances) the blade can still be loaded into the slot. The total tape thickness can be provided e.g. with a double layer of tape. A thinner tape can be used in a multilayer with thicker tape to fine tune the overall tape thickness.

Preferably the tape also has a smooth top surface which allows easy sliding of blades over the tape during build.

The tape can be wide enough to have some amount hanging over the outer disc edge so that it can be easily gripped by hand and pulled off. The after-grind wash process typically assists in loosening the adhesion of the tape to make it easier to remove after wash.

Figure 9:
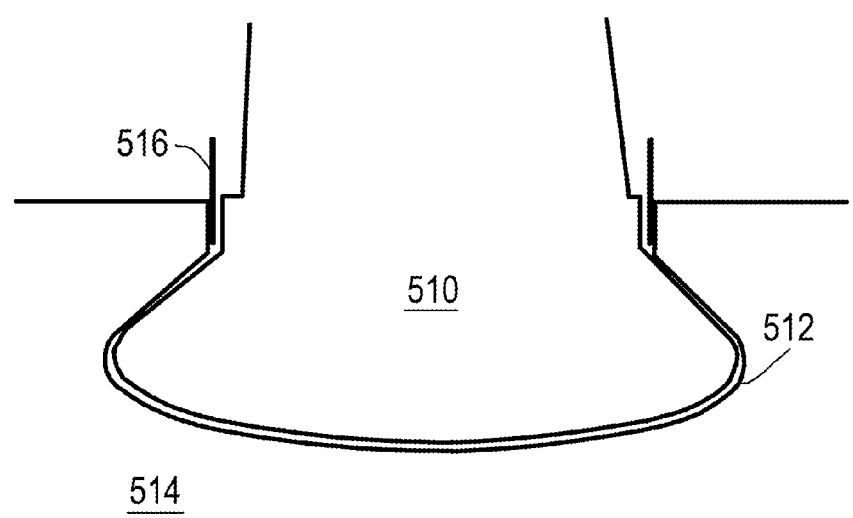
FIG. 9 shows schematically a blade loaded in an axial slot of a disc, with tape applied at the mouth of the slot.

The method can also be used to reduce the range of tilt angles of blades of an axially slotted disc during blade tip grinding. FIG. 9 shows schematically, for example, a blade 510 loaded in an axial slot 512 of a disc 514, with tape 516 applied at the mouth of the slot to reduce the distance across the mouth and thereby reduce the range of tilt angles which can be adopted by the blade.

By providing a narrower distribution of ground blade lengths, the method can reduce casing rub and tip leakage, resulting in specific fuel consumption improvements which may be of the order of 0.1-0.2%. In addition, the method reduces instances of rubbing-induced blade cracking.

While the disclosure has been described in conjunction with the exemplary embodiments described above, many equivalent modifications and variations will be apparent to those skilled in the art when given this disclosure. For example, although the above embodiments show the tape applied along both sides of the slots, it is also possible to apply the tape only along one side of a given slot. Accordingly, the exemplary embodiments of the disclosure set forth above are considered to be illustrative and not limiting. Various changes to the described embodiments may be made without departing from the spirit and scope of the invention.

All references referred to above are hereby incorporated by reference.

We claim:

1. A method of grinding tips of one or more blades of a row of blades which forms part of a rotor for a gas turbine engine, the method including:
   providing a rotor disc having a slot for mounting one or more blades;
   applying tape at one or both sides of the slot such that, when each of the one or more blades is loaded in the slot, the tape reduces a range of tilt angles which can be adopted by the blade;
   loading the one or more blades in the slot;
   performing a grinding operation on a blade tip of each of the loaded one or more blades; and
   removing the tape from the disc after the grinding operation.

2. The method according to claim 1, wherein the slot is a circumferential slot for mounting a plurality of the blades.

3. The method according to claim 1, wherein:
   the rotor disc has a plurality of axial slots for mounting respective ones of the blades,
   the tape is applied at one or both sides of each slot, and
   the blades are loaded in the slots.

4. The method according to claim 1, wherein the tape reduces the range of tilt angles by at least 50%.

5. The method according to claim 1, wherein:
   each of the one or more blades has a laterally-projecting platform that extends over a rim of the disc, and
   the tape reduces the clearance between each of the platforms and the rim and thereby reduces the range of tilt angles that can be adopted by the one or more blades.

6. The method according to claim 1, wherein the tape reduces the distance across a mouth of the slot and thereby reduces the range of tilt angles that can be adopted by the one or more blades.

7. The method according to claim 1, wherein the tape is a polymer tape.

8. The method according to claim 1, wherein the tape has an adhesive layer for adhering to the rotor disc.

9. The method according to claim 1, further comprising balancing each of the one or more blades before the blade is processed.

10. The method according to claim 1, further comprising applying a protective coating to each of the loaded one or more blades to protect the blade from debris generated during the grinding operation.

* * * * *